United States Patent [19]

Kaes

[11] Patent Number: 4,869,562
[45] Date of Patent: Sep. 26, 1989

[54] MAGNETIC VALVE WITH CONNECTION DEVICE FOR BRAKE SYSTEMS

[75] Inventor: Guenter Kaes, Stuttgart, Fed. Rep. of Germany

[73] Assignee: Robert Bosch GmbH, Stuttgart, Fed. Rep. of Germany

[21] Appl. No.: 207,473

[22] Filed: Jun. 16, 1988

[30] Foreign Application Priority Data

Jul. 14, 1987 [DE] Fed. Rep. of Germany ....... 3723223

[51] Int. Cl.$^4$ ............................................. B60T 13/68
[52] U.S. Cl. .................................... 303/119; 188/353; 285/9.1; 285/382.5; 303/15; 303/113; 303/89
[58] Field of Search ................. 303/119, 114, 113, 15, 303/89, 1; 188/353; 251/129.01-129.22; 239/585; 285/9.1, 382.4, 382.5, 272, 278; 60/545, 591, 550

[56] References Cited

U.S. PATENT DOCUMENTS

| | | | |
|---|---|---|---|
| 1,858,136 | 5/1932 | Brenner | 285/382.5 X |
| 2,504,428 | 4/1950 | Kimball | 251/129.19 |
| 2,522,194 | 9/1950 | Richardson | 285/383.5 X |
| 2,543,088 | 2/1951 | Woodling | 285/382.5 X |
| 2,698,159 | 12/1954 | Crum | 251/129.19 |
| 2,735,047 | 2/1956 | Garner et al. | 251/129.19 X |
| 3,687,495 | 8/1972 | Sakamoto et al. | 285/382.5 X |
| 3,729,235 | 4/1973 | Bach et al. | 303/114 |
| 3,991,573 | 11/1976 | Harries | 60/550 |
| 4,422,695 | 12/1983 | Farr | 303/115 |
| 4,428,624 | 1/1984 | Farr | 303/116 |
| 4,529,166 | 7/1985 | Klausen et al. | 251/129.02 |
| 4,555,144 | 11/1985 | Belart et al. | 303/119 X |
| 4,561,701 | 12/1985 | Fujii et al. | 251/129.15 X |
| 4,705,324 | 11/1987 | Kervagoret | 60/545 X |
| 4,774,976 | 10/1988 | Janecke et al. | 251/129.08 X |

FOREIGN PATENT DOCUMENTS

| | | |
|---|---|---|
| 105219 | 4/1984 | European Pat. Off. . |
| 3145950 | 6/1983 | Fed. Rep. of Germany . |
| 506929 | 12/1954 | Italy .................................... 188/353 |

Primary Examiner—Douglas C. Butler
Attorney, Agent, or Firm—Edwin E. Greigg

[57] ABSTRACT

A magnetic valve with a connection device is proposed, in which the housing is rotatable relative to the connection device, which encompasses a connector stub formed onto the housing. Embodying the connection device as a male fitting enables the alignment of the housing and the cable plug located on it, which is especially useful when the magnetic valve is installed in a wheel connection of a master brake cylinder. In another version, in which the connector stub is connected to the connection device positively with a snap-in ring, the magnetic valve can be inserted even at inaccessible locations. If the connection device is embodied as part of a brake cylinder, then the magnetic valve can be inserted directly, and the result is a connection that is secure against manipulation.

5 Claims, 1 Drawing Sheet

4,869,562

MAGNETIC VALVE WITH CONNECTION DEVICE FOR BRAKE SYSTEMS

BACKGROUND OF THE INVENTION

Magnetic valves for use in brake systems are known that are equipped with rigidly disposed connection devices and an electrical cable plug located on the housing. When they are used in a non-rotatable structural part, such as a master brake cylinder, the housing and the cable plug cannot be properly aligned.

OBJECT AND SUMMARY OF THE INVENTION

The magnetic valve of this invention has an advantage that the housing and the cable plug located in the housing can be rotated about the axis of symmetry of the connector stub and thereby aligned without rotation of the connector. Furthermore, the connection device that is rotatable relative to the housing has an advantage that when the magnetic valve is secured to a brake cylinder, the connector is screwed into the brake cylinder and the magnetic valve housing does not undergo a screwing moment.

It is particularly advantageous to embody the connection device as a male fitting surrounding the connector stub, which is crimped on its end for a sealing effect, so that the magnetic valve can be screwed directly into a master brake cylinder connection.

In another version of the connections device, in which a snap-in ring engaging both the connection device and the connector stub effects the positive connection, the magnetic valve can be installed even at inaccessible locations simply by plugging it in.

In a further feature of the invention, the connection device is part of the brake cylinder, so that a connection is obtained that is secured against manipulation.

By using an O-ring as the sealing element between the connector stub and the connection device, a particularly simple and functionally dependable seal is obtained.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
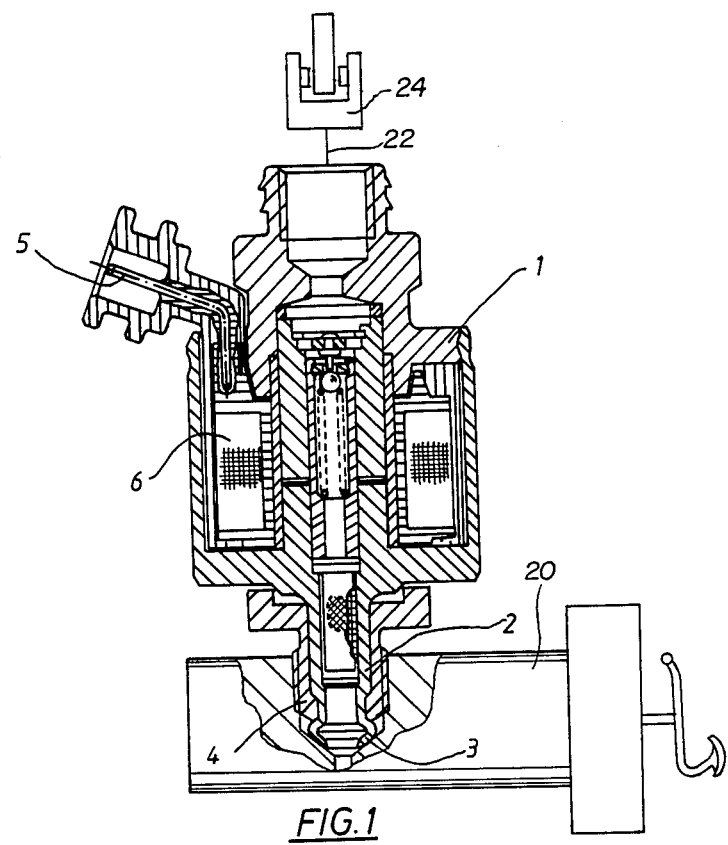
FIG. 1 shows a first exemplary embodiment of a magnetic valve with a connection device connected at one end to a master brake cylinder and at the opposite end to a wheel brake cylinder.

In the magnetic valve shown in FIG. 1, a housing connector stub 2 is formed onto a housing 1 containing a magnetic valve with a crimp 3 disposed on the end of the housing connector stub. The crimp 3 and housing connector stub 2 also secures a connection device 4 coaxially with the housing connector stub so that the connection device will rotate about the connector stub 2. The connection device is provided with screw threads on its outer surface for threading into a threaded receptable of a brake cylinder 20. When the magnetic valve is secured onto a brake cylinder by rotation of the connection device 4 surrounding the housing connector stub 2, the cable plug 5 for the magnet coil 6 located on the housing 1 can be aligned relative to the brake cylinder. The connection device 4 is embodied here as a male fitting. Since the connection device 4 is rotatable about the housing connector stub 2, the housing can be held in place as the connection device is threaded into the brake cylinder. Before assembly of the connection device 4 onto the housing connector stub 2, the housing connector stub is not crimped. The connection device 4 is pushed onto the housing connection stub 2 and then the outer end of the housing connector stub is crimped which secures the connection device in place. The upper end of the magnetic valve is secured by a fluid line 22 to a wheel brake cylinder 24.

Figure 2:
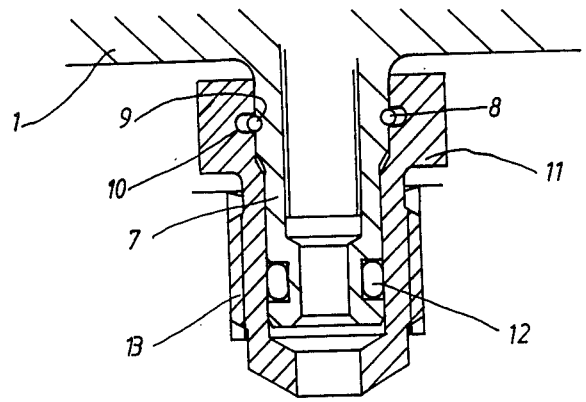
FIG. 2 shows an exemplary embodiment of a connection device with a connector stub inserted.

A connector stub 7 formed onto the housing 1 as shown in FIG. 2 is positively connected to a connection device 11 with a snap-in ring 8, which engages both an annular groove 9 of the connector stub 7 and an annular groove 9 of the connector stub 7 and an annular groove 10 of the connection device 11. The connection device 11 is rotatable relative to the connector stub 7 and is embodied as a screw-insertable part. An O-ring 12 effects sealing between the connector stub 7 and the screw-insertable part, which can be screwed with a thread 13 into a brake cylinder. Since the connection device 11 rotates relative to the magnetic valve the electrical connector may be positioned at any desired position.

The connection device 11 is shown assembled onto the housing connector stub 7. However, it should be clear to one skilled in tha art that the connection device could be threaded into a threaded opening in a brake cylinder to which the magnetic valve is to be secured and the housing connection stub end 7 slipped into the housing connector already threaded into the brake cyliner. When the stub end of the magnetic valve is pushed into the connection device 11, the magnetic valve will be secured in place by the ring 8 fitting into annular groove 10 on the connection device and the annular groove 9 on the housing connector stub 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnetic valve including a housing, a connection device for connecting said magnetic valve at each end thereof to a master brake cylinder, and at its other end to a wheel brake cylinder of a motor vehicle, said magnetic valve further including a housing extension that forms a connection stub (2), said connection stub includes a crimped end (3), said connection device (4) includes threads on its outer surface and is disposed on and rotatable relative to said housing connection stub (2) between said crimped end thereon and a portion of said housing for threading into a master brake cylinder connection thereby connecting said magnetic valve to said master brake cylinder without rotating said magnetic valve.

2. A magnetic valve as set forth in claim 1 wherein said connection device (4) includes an enlarged portion above said threads by which said connection device can be threaded into said master brake cylinde.

3. A magnetic valve including a housing, a connection device for connecting said magnetic valve at one end thereof to a master brake cylinder, and at its other end to a wheel brake cylinder of a motor vehicle, said magnetic valve further including a housing extension that forms a connection stub (7), said connection device (11) includes threads on its outer surface and is rotatably disposed on said housing connection stub (7), said connection device (11) includes an annular groove (10) in its inner surface, said connection stub includes an annular groove (9) in its outer surface which corresponds with said annular groove (10) in the inner surface of said connection device, and a snap-in ring (8) is carried by said annular groove (9) in the outer surface of said housing connection stub whereby said connection device (11) is secured on said housing connector stub (7) by said snap-in ring (8) inserted into said annular groove (10) on said connection device (11) at such time as said snap-in ring (8) engages said corresponding inner annular groove (9) on said connector stub (7).

4. A magnetic valve as defined by claim 3, in which said connection device (11) is part of the master brake cylinder.

5. A magnetic valve as defined by claim 3, in which an o-ring sealing element is provided between the connection stub (7) and the connection device (11).

* * * * *